(12) United States Patent
Kim et al.

(10) Patent No.: US 7,983,357 B2
(45) Date of Patent: Jul. 19, 2011

(54) METHOD FOR TRANSMITTING AND RECEIVING DATA IN A MULTI-CARRIER SYSTEM

(75) Inventors: Hak Seong Kim, Seoul (KR); Bong Hoe Kim, Gyeonggi-do (KR); Dong Wook Roh, Seoul (KR); Joon Kui Ahn, Seoul (KR); Dong Youn Seo, Seoul (KR); Jung Hoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 582 days.

(21) Appl. No.: 11/996,284

(22) PCT Filed: Jul. 20, 2006

(86) PCT No.: PCT/KR2006/002860
§ 371 (c)(1),
(2), (4) Date: Jul. 22, 2008

(87) PCT Pub. No.: WO2007/011181
PCT Pub. Date: Jan. 25, 2007

(65) Prior Publication Data
US 2009/0041092 A1 Feb. 12, 2009

(30) Foreign Application Priority Data

Jul. 22, 2005 (KR) .......................... 10-2005-0066869

(51) Int. Cl.
*H04L 27/00* (2006.01)
(52) U.S. Cl. ........ 375/295; 375/261; 375/260; 375/298; 375/299; 375/349
(58) Field of Classification Search .................. 375/295, 375/261, 260, 298, 299, 349
See application file for complete search history.

(56) References Cited

U.S. PATENT DOCUMENTS

2005/0226141 A1* 10/2005 Ro et al. ........................ 370/203
2006/0256839 A1* 11/2006 Tsai et al. ..................... 375/131

FOREIGN PATENT DOCUMENTS

| CN | 1547818 | 11/2004 |
|----|---------|---------|
| WO | WO 2004/008681 A1 | 1/2004 |
| WO | 2004/019532 | 3/2004 |

OTHER PUBLICATIONS

Ranlefs R. et al., "Comparing Multicarrier Based Broadband Systems for Higher Modulation Cardinalities.", 60th Vehicular Technology Conference 2004, Los Angeles, CA, USA, Sep. 26, 2004; pp. 3398-3403; XP010787506, ISBN 0-7803-8521-7.

* cited by examiner

*Primary Examiner* — Kabir A Timory
(74) *Attorney, Agent, or Firm* — Lee, Hong, Degerman, Kang & Waimey

(57) ABSTRACT

A method of transmitting data in a multi-carrier communication system is disclosed. More specifically, the method includes mapping at least one data symbol to at least one subcarrier of a first frequency domain and at least one data symbol to at least one subcarrier of a second frequency domain, wherein the first frequency domain and the second frequency domain are mutually exclusive and the at least one data symbol mapped to the at least one subcarrier of the second frequency domain is multiplied by a spreading code, transforming the at least one data symbol mapped to the first frequency domain and the at least one data symbol mapped to the second frequency domain by an inverse discrete Fourier transform (IDFT) module, and transmitting the transformed data symbols to a receiving end.

8 Claims, 13 Drawing Sheets

FIG. 4
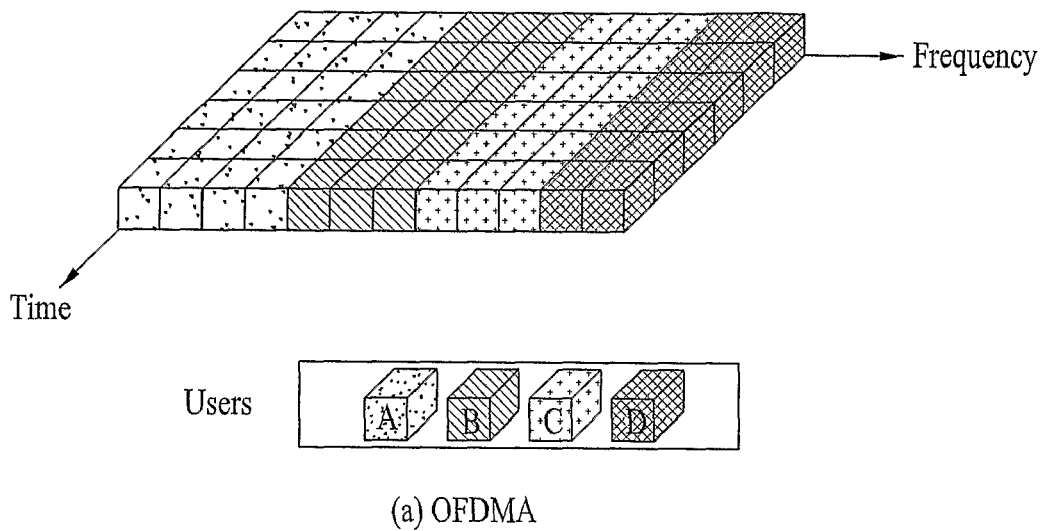
(a) OFDMA
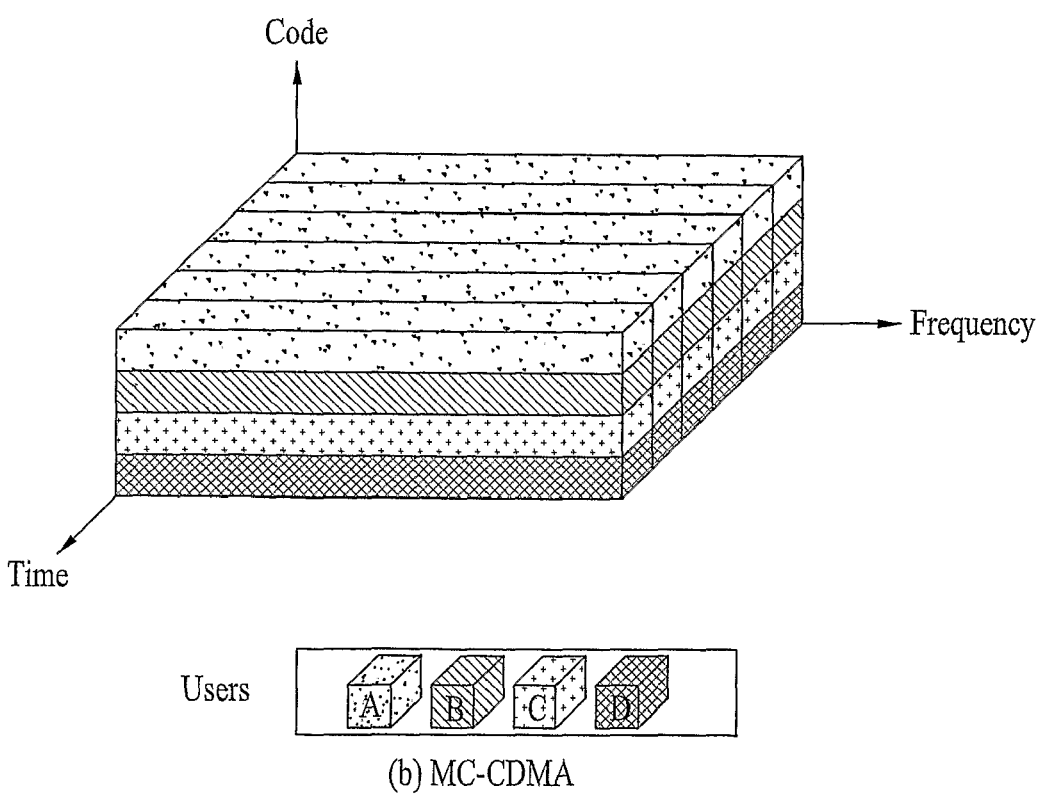
(b) MC-CDMA

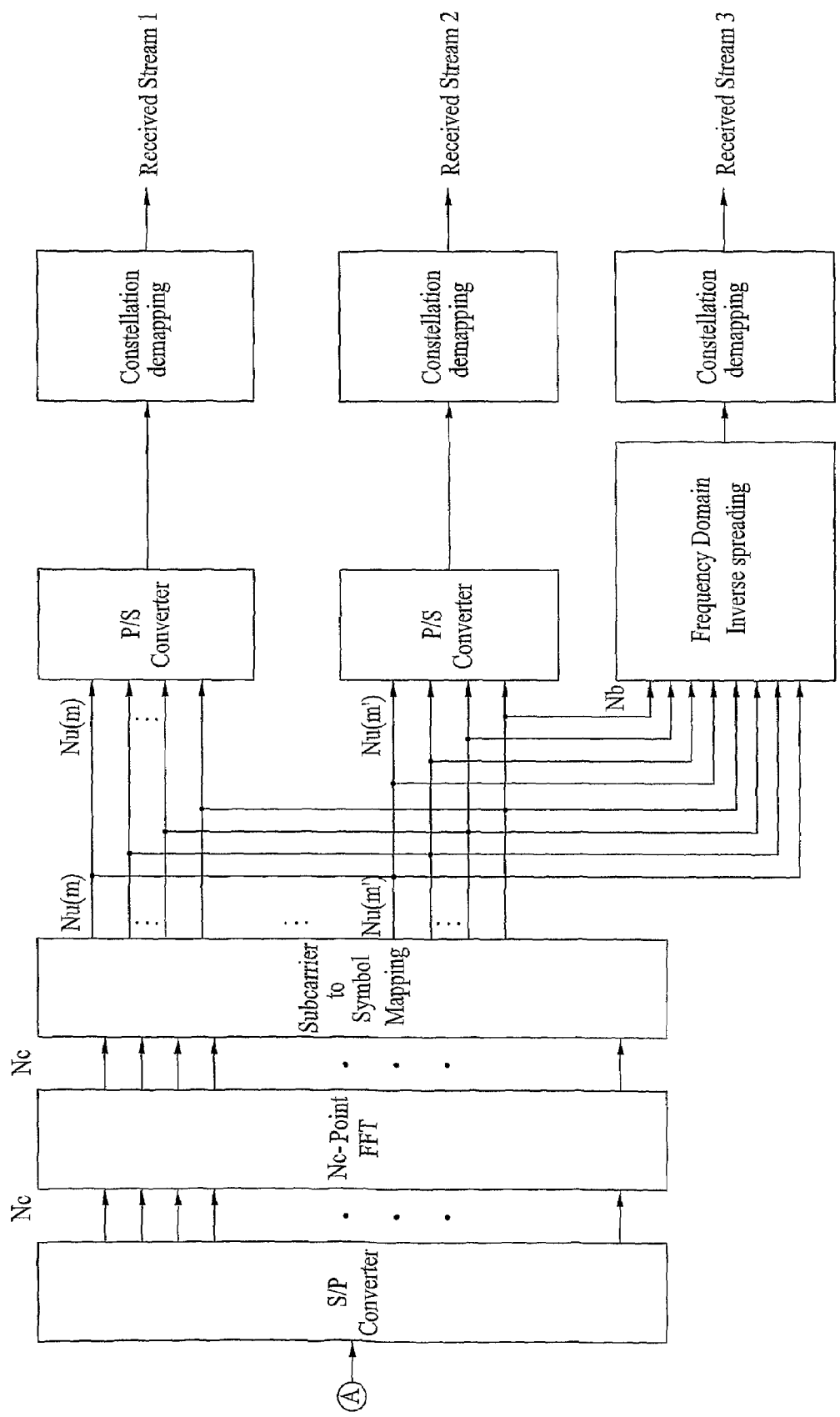

METHOD FOR TRANSMITTING AND RECEIVING DATA IN A MULTI-CARRIER SYSTEM

CROSS-REFERENCE TO RELATED APPLICATIONS

This application is a 371 U.S. national stage application of International Application No. PCT/KR2006/002860, filed on Jul. 20, 2006, which claims priority to Korean Patent Application No. 10-2005-0066869, filed on Jul. 22, 2005, the contents of which are incorporated by reference herein in their entirety.

TECHNICAL FIELD

The present invention relates to a method of transmitting and receiving data, and more particularly, to a method of transmitting and receiving data in a multi-carrier system.

BACKGROUND ART

An orthogonal frequency division multiplexing (OFDM) divides high rate data stream to a plurality of low rate data streams and transmits these two types of data streams by using a plurality of carriers. Here, each of the plurality of carriers is called a subcarrier. Since orthogonality exists between each of the plurality of carriers in OFDM, the receiving end can still detect and decode even if the frequency characteristics of the carriers are overlapped. The high rate data stream is passed through a serial-to-parallel (S/P) converter and converted into the low rate data stream. Thereafter, the subcarriers are multiplied the converted data streams, and each data stream is added and transmitted to the receiving end.

The data streams converted by the S/P converter can be allocated to a plurality of subcarriers after being applied an Inverse Discrete Fourier Transform (IDFT). Here, an Inverse Fast Fourier Transform (IFFT) can be used in place of the IDFT.

Since symbol duration of the subcarriers carrying low data rate stream increases, signal dispersion in time domain caused by multi-path delay spread decreases relative to the symbol duration. A guard interval that is longer than channel delay between the OFDM symbols in order to reduce inter-symbol interference (ISI). Furthermore, a part of the OFDM signal is placed in the guard interval and place the guard interval in front portion of the symbol to protect the symbol by the OFDM symbol becoming cyclically extended.

An OFDM Access (OFDMA) refers to a method for multiple access which provides available subcarriers to each user in a system using the OFDM for modulation. In other word, the OFDMA scheme allocates frequency resources (e.g., subcarriers) to data symbols associated with each user, and each of these frequency resources is independently allocated so as to prevent overlapping and interference. Simply put, the frequency resources are allocated mutually exclusively.

A Multiple Carrier Code Division Multiple Access (MC-CDMA) refers to another method of preventing interference between data symbols. More specifically, the MC-CDMA scheme spreads data symbols by multiplying different codes to the data symbols and allocating them across a frequency domain so that the data symbols are distinguishable by the receiving end.

However, the OFDMA and the MC-CDMA schemes have following issues to be resolved. With respect to the conventional OFDMA scheme, as discussed above, each frequency domain is allocated to the each user and not shared with other users. As such, if a serving cell allocates a first frequency domain to a first user, serving cells neighboring the first serving cell cannot use the first frequency domain of its respective cells due to interference from using the same frequency domain. To resolve this conflict, the neighboring cells cannot use the same frequency domain. The shortcoming of this type of resource avoidance is that frequency reuse factor decreases.

With respect to the conventional MC-CDMA scheme, as discussed above, the data symbols are spread across the entire frequency domain. As such, in a frequency selective channel environment, an equalizer must be used and thus, frequency diversity cannot be fully utilized and result in capability deterioration.

DISCLOSURE OF THE INVENTION

Accordingly, the present invention is directed to a method of transmitting and receiving data in a multi-carrier system that substantially obviates one or more problems due to limitations and disadvantages of the related art.

An object of the present invention is to provide a method of transmitting data in a multi-carrier communication system.

Another object of the present invention is to provide a method of receiving data in a multi-carrier communication system.

Another object of the present invention is to provide an apparatus for transmitting data in a multi-carrier communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting data in a multi-carrier communication system includes mapping at least one data symbol to at least one subcarrier of a first frequency domain and at least one data symbol to at least one subcarrier of a second frequency domain, wherein the first frequency domain and the second frequency domain are mutually exclusive and the at least one data symbol mapped to the at least one subcarrier of the second frequency domain is multiplied by a spreading code, transforming the at least one data symbol mapped to the first frequency domain and the at least one data symbol mapped to the second frequency domain by an inverse discrete Fourier transform (IDFT) module, and transmitting the transformed data symbols to a receiving end.

In another aspect of the present invention, a method of transmitting data in a multi-carrier communication system includes mapping at least one data symbol of a first group to at least one subcarrier, wherein the at least one data symbol of the second group is combined with the at least one data symbol of the first group and wherein the subcarriers carrying the at least one data symbols of the first group and the at least one data symbols of the second group are mutually exclusive, transforming the data symbols of the first group, combined with the data symbols of the second group, mapped to a plurality of subcarriers by an inverse discrete Fourier transform (IDFT) module, and transmitting the transformed data symbols to a receiving end.

Yet, in other aspect of the present invention, a method of receiving data in a multi-carrier communication system includes receiving transformed data symbols on a plurality of subcarriers from a transmitting end, transforming the received data symbols by a discrete Fourier Transform (DFT) module to identify at least one data symbol mapped to the first frequency domain and at least one data symbol mapped to the second frequency domain, and demapping the at least one data symbol from at least one subcarrier of the first frequency domain and the at least one data symbol from the at least one subcarrier of the second frequency domain, wherein the first frequency domain and the second frequency domain are mutually exclusive and the at least one data symbol mapped to the at least one subcarrier of the second frequency domain is multiplied by a spreading code.

In a further aspect of the present invention, a method of receiving data in a multi-carrier communication system includes receiving transformed data symbols on a plurality of subcarriers from a transmitting end, transforming the received data symbols by a discrete Fourier Transform (DFT) module to identify the at least one data symbol mapped to the first group and the at least one data symbol mapped to the second group, and demapping the at least one data symbol from at least one subcarrier of the first group and the at least one data symbol from the at least one subcarrier of the second group, wherein the at least one data symbol of the second group is combined with the at least one data symbol of the first group and wherein the subcarriers carrying the at least one data symbols of the first group and the at least one data symbols of the second group are mutually exclusive.

In another aspect of the present invention, an apparatus for transmitting data in a multi-carrier communication system includes a mapping module for mapping at least one data symbol to at least one subcarrier of a first frequency domain and at least one data symbol to at least one subcarrier of a second frequency domain, wherein the first frequency domain and the second frequency domain are mutually exclusive and the at least one data symbol mapped to the at least one subcarrier of the second frequency domain is multiplied by a spreading code, a transformer for transforming the at least one data symbol mapped to the first frequency domain and the at least one data symbol mapped to the second frequency domain by an inverse discrete Fourier transform (IDFT) module, and a transmitter for transmitting the transformed data symbols to a receiving end.

In a further aspect of the present invention, an apparatus for transmitting data in a multi-carrier communication system includes a mapping module for mapping at least one data symbol of a first group to at least one subcarrier, wherein the at least one data symbol of the second group is combined with the at least one data symbol of the first group and wherein the subcarriers carrying the at least one data symbols of the first group and the at least one data symbols of the second group are mutually exclusive, a transformer for transforming the data symbols of the first group, combined with the data symbols of the second group, mapped to a plurality of subcarriers by an inverse discrete Fourier transform (IDFT) module, and a transmitter for transmitting the transformed data symbols to a receiving end.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates resource allocation with respect to frequency, code, and time according to conventional OFDMA and MC-CDMA schemes;

FIG. 7d is a block diagram of a receiving end of a communication system using combined OFDMA and MC-CDMA schemes according to another embodiment of the present invention.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
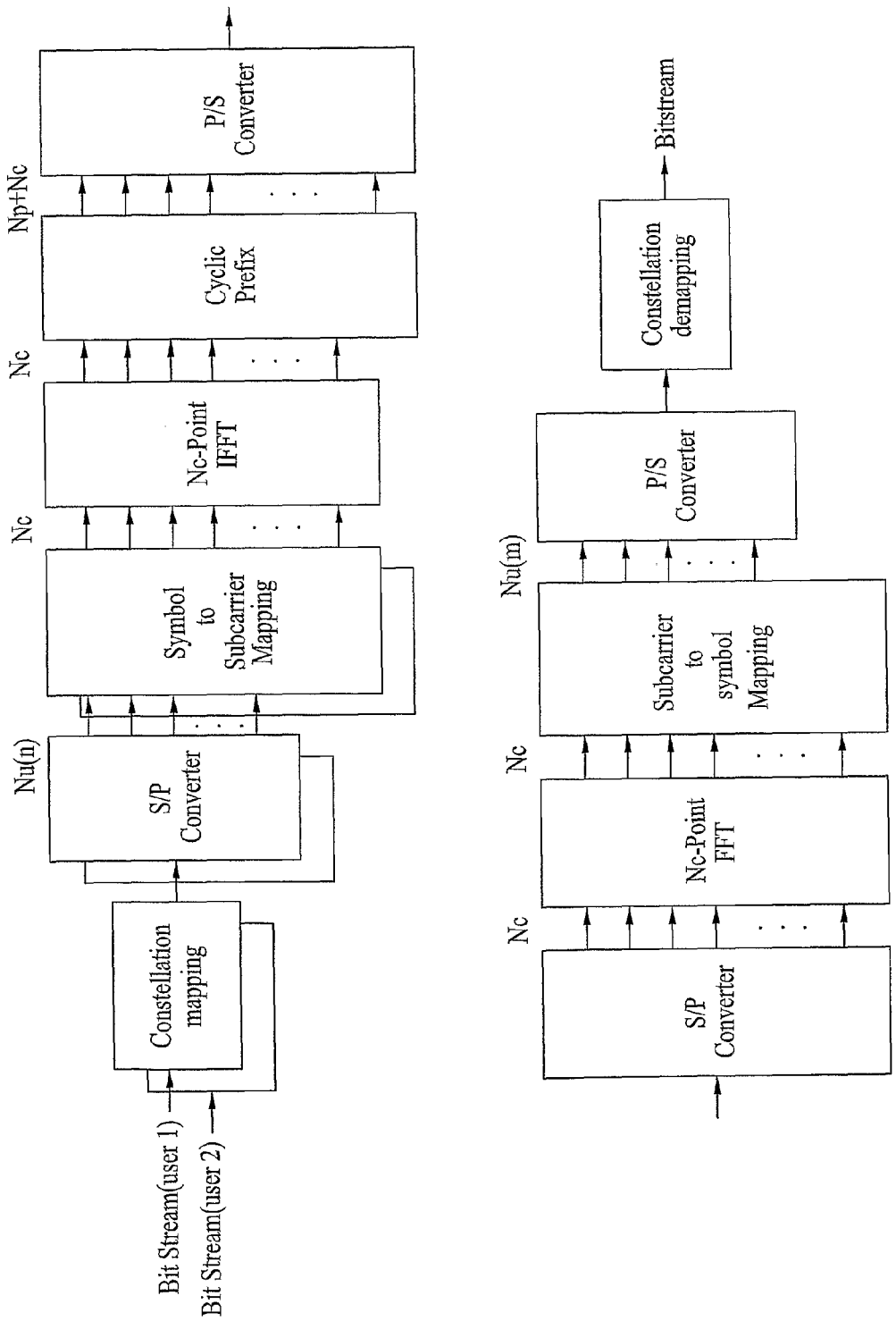
FIG. 1 is a block diagram of a transmitting end using OFDMA.

FIG. 1 is a block diagram of a transmitting end using OFDMA. In the transmitting end, bit streams for a plurality of users are mapped by a constellation mapping module using various modulation schemes such as a Quadrature Phase Shift Keying (QPSK) or 16 Quadrature Amplitude Modulation (QAM). The bit streams are mapped to data symbols by the constellation mapping module, and the data symbols are converted to parallel data symbols by a S/P converter. Here, a number of the data symbols converted by the S/P converter equal a number of subcarriers (e.g., Nu(n)) allocated to each user (e.g., n). Since the number of subcarriers allocated to each user can be same or different, correspondingly, the number of data symbols of each user converted by the S/P converter can be same or different parallel data symbols.

In a symbol-to-subcarrier mapping module, the converted parallel data symbols are mapped to a specified number of subcarriers (Nu(n)), which are allocated to specified number of users (n), out of Nc number of subcarriers. The remaining Nc−Nu(n) number of subcarriers are mapped to the data symbols of other users. Moreover, the symbol-to-subcarrier mapping module performs zero padding to subcarriers which are not allocated to any users.

Thereafter, the output of the symbol-to-subcarrier mapping module is inputted to a Nc-Point IFFT module. To the output of the Nc-Point IFFT module, a cyclic prefix is added in order to reduce the ISI. Lastly, the output with the cyclic prefix added thereto is processed through a parallel-to-serial (P/S) converter before being transmitted to a receiving end.

In the receiving end using the OFDMA scheme, an inverse operation/procedure as described above with respect to the operation/procedure of the transmitting end takes place. That is, the received data symbols are processed through the S/P converter and a Nc-Point Fast Fourier Transform (FFT), after which the processed data symbols are processed by a subcarrier-to-symbol mapping module. To put simply, the receiving end decodes the received data symbols.

Figure 2:
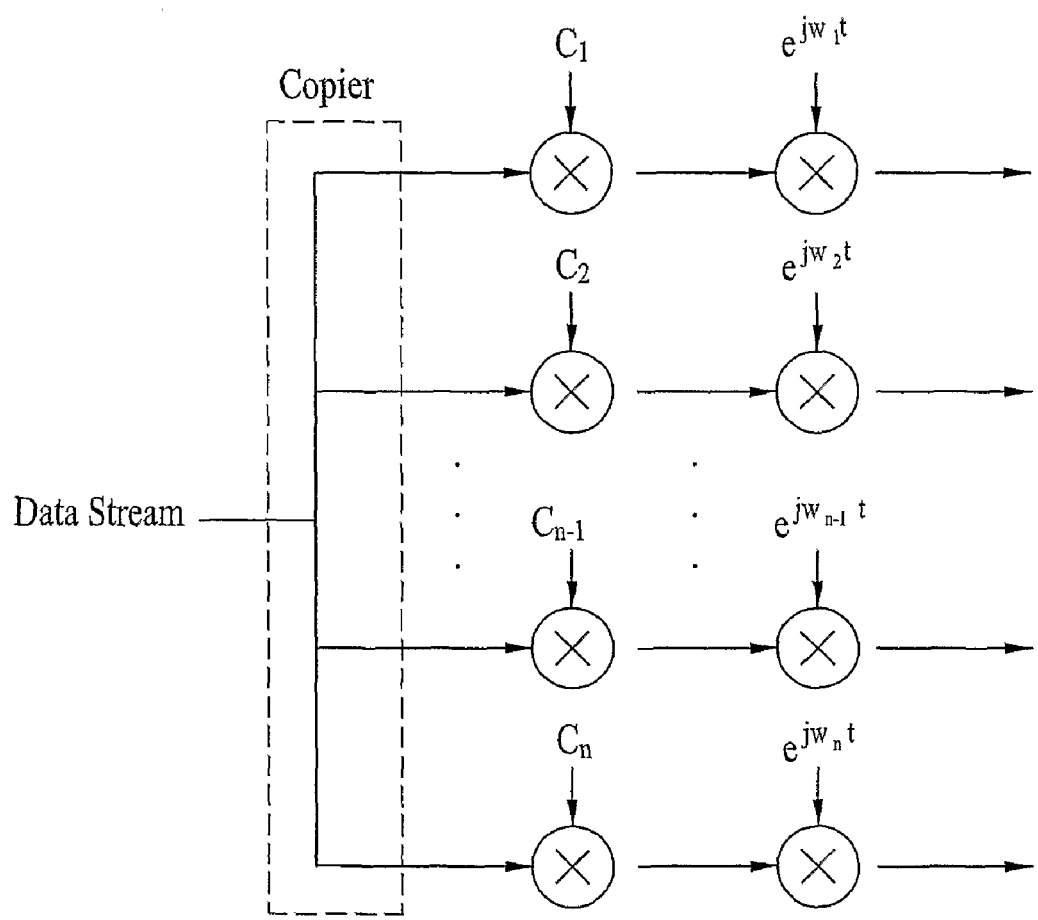
FIG. 2 is a diagram of a conventional frequency domain spreading and scrambling module for a Multiple Carrier Code Division Multiple Access (MC-CDMA) transmission.

FIG. 2 is a diagram of a conventional frequency domain spreading and scrambling module for a Multiple Carrier Code Division Multiple Access (MC-CDMA) transmission. Referring to FIG. 2, a single data stream is duplicated by a copier and becomes a parallel data stream which is then multiplied by a code. Here, the code is unique for each parallel data stream. The code is represented by multiple code values, labeled $C_1$-$C_n$. That is $[C_1, C_2, \ldots C_{n-1}, C_n]$ represents a single code.

The parallel data streams, each of which are multiplied by a different code, is transmitted by n number of carriers ($e^{jw_n t}$), and as such, the frequency domain spreading is executed based on n number of carriers.

Figure 3:
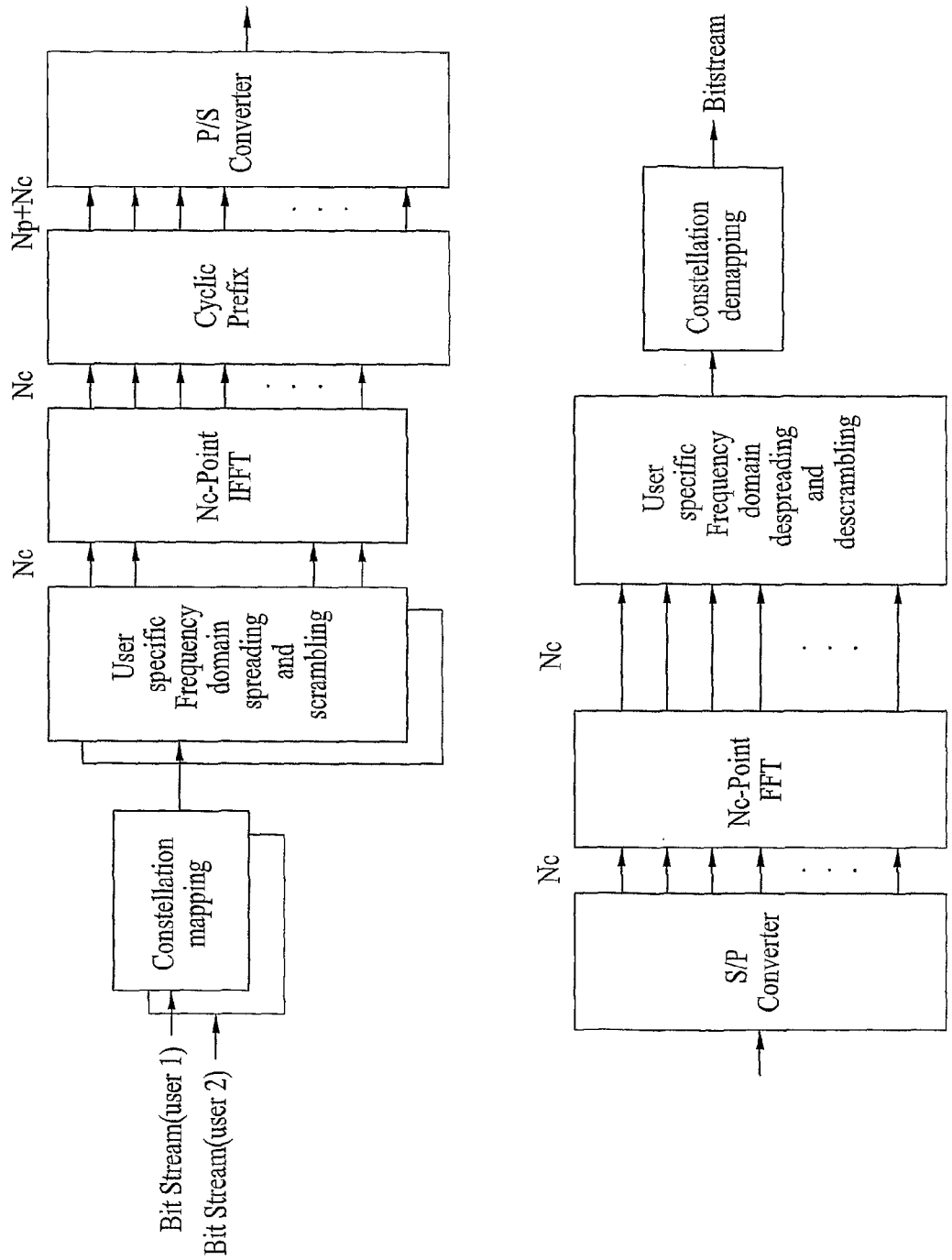
FIG. 3 is a block diagram of conventional MC-CDMA transmitting/receiving ends.

FIG. 3 is a block diagram of conventional MC-CDMA transmitting/receiving ends. The bit streams for a plurality of users are mapped by the constellation mapping module using various modulation schemes such as the QPSK or 16 QAM. The mapped bit streams are then processed by the frequency domain spreading and scrambling module for MC-CDMA. In this module, the bit streams are spread across Nc number of subcarriers on the frequency domain. Further, in this module, codes maintaining orthogonality with each other is applied to each user's data symbols, and due to orthogonality of the codes, the output from the module can be combined for transmission. The output of this module is then inputted into the Nc-Point IFFT module.

As discussed above, the output of the IFFT module is added the cyclic prefix in order to reduce the ISI. After this process, the output is inputted into the P/S converter.

The receiving end processes or decodes the received data using an operation inverse to that of the transmitting end. More specifically, the signal received from the transmitting end enters the S/P converter and the Nc-Point FFT module. The output of the Nc-Point FFT module is then inputted into a frequency domain inverse spreading and scrambling module. Since the data symbols were spread to Nc number of subcarriers at the transmitting end, the receiving end performs inverse operation on Nc number of subcarriers to decode the received data symbols.

FIG. 4 illustrates resource allocation with respect to frequency, code, and time according to conventional OFDMA and MC-CDMA schemes. In the OFDMA scheme, specific frequency resources (e.g., subcarriers) are allocated only to specific users. As such, the frequency resources are not shared with other users. In the MC-CDMA scheme, the data symbols of each user are spread across the entire frequency domain. Since the data symbols spread across the entire frequency domain are independently coded, a plurality of data symbols can be spread on the same frequency at the same time frame. Consequently, the receiving end can detect the received data symbols without complications. Further, since the data symbols are spread across the entire frequency domain, the entire frequency domain is shared by the users.

Figure 5A:
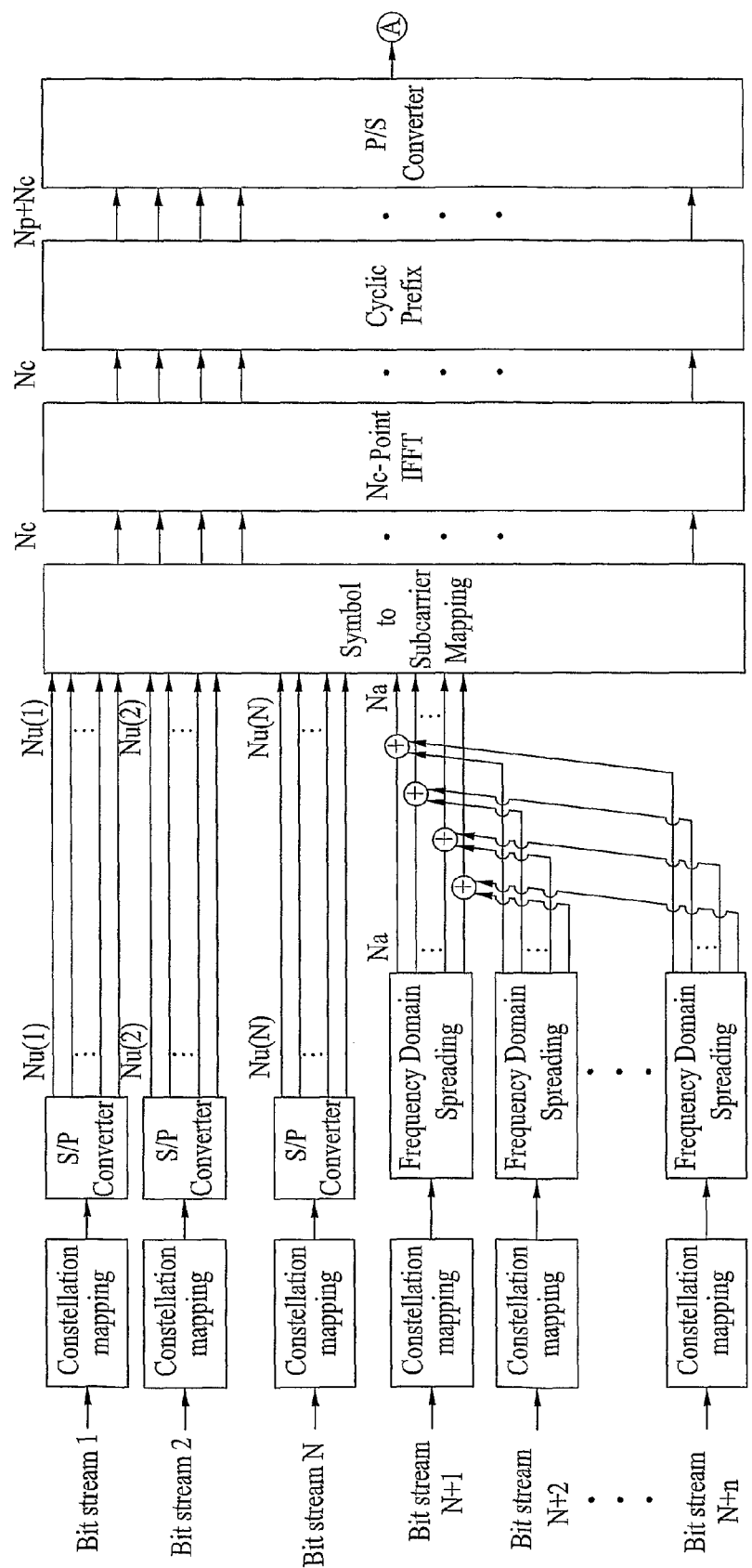
FIG. 5a is a block diagram of a transmitting end of a communication system using combined OFDMA and MC-CDMA schemes according to an embodiment of the present invention.

FIG. 5a is a block diagram of a transmitting end of a communication system using combined OFDMA and MC-CDMA schemes according to an embodiment of the present invention. A structure of the transmitting end of the communication system includes at least one constellation mapping module, at least one S/P converter corresponding to the constellation mapping module, a frequency domain spreading module corresponding to the constellation mapping module, a symbol-to-subcarrier module, a Nc-Point IFFT module, a cyclic prefix module, and a P/S converter.

In the transmitting end, the constellation module maps at least one data bit to a data symbol using a modulation scheme. Here, there can be more than one data symbols containing at least one data bit. For example, if 8 Phase Shift Keying (PSK) modulation scheme is used, three (3) data bits are mapped to one PSK symbol, and if 16 QAM is used, then four (4) data bits are mapped to one QAM symbol.

The S/P converter converts the data symbols inputted serially (hereafter, referred to as serial data symbols) to a specified number data symbols arranged in parallel format (hereafter, referred to as parallel data symbols). Here, a number of parallel data symbols converted according to the number is defined by each S/P converter.

Each frequency domain spreading module applies a code that is different from each other and the data symbols are spread on the frequency domain. Here, the data symbols are spread Na times on the frequency domain. Preferably, the codes applied in the frequency domain spreading module maintain orthogonality. The output of each frequency domain spreading module can be combined by the receiving end since the outputs are applied orthogonal codes and thus the outputs are orthogonal to each other as well.

The symbol-to-subcarrier mapping module maps each data symbol to a specific subcarrier while '0's are assigned to non-allocated subcarriers. Further, the symbol-to-subcarrier mapping module maps the data symbols outputted from the S/P converter and the data symbols outputted from the frequency domain spreading module to the subcarriers in respectively different frequency domains.

The Nc-Point IFFT module multiplies the data symbols mapped by the symbol-to-subcarrier mapping module to the subcarriers. Furthermore, the cyclic prefix module attaches a cyclic prefix which is a guard interval that is longer than the delay spread of the wireless channel. Here, in the guard interval, a copy of the part of the OFDM signal is attached to the front of the symbol.

The operations of the transmitting end are as follows. A plurality of bit streams is inputted for processing. A specified group of bit streams (hereafter, referred to as a first group) from the plurality of bit streams are mapped to data symbols by the constellation mapping module. Here, the first group refer to bit stream 1-bit stream N, as shown in FIG. 5a. Subsequently, the data symbols are processed by the S/P converter. There can be more than one S/P converter. The data symbols processed by the S/P converter can be converted into same or different (e.g., Nu(n)) number of parallel data symbols.

More specifically, the data symbol for bit stream 1 is converted to Nu(1) number of parallel data symbols. As such, Nu(1) can be defined as a number of subcarriers for bit stream 1. The number of subcarriers allocated for each bit stream can be same or different. The parallel data symbols are then mapped to the subcarriers by the symbol-to-subcarrier mapping module. That is, the data symbols of the first group are mapped to subcarriers of a defined frequency domain (hereafter, referred to as a first frequency domain—in which the subcarriers can be consecutive or distributed). Since the data symbols associated with the bit streams of the first group are converted to parallel data symbols having sizes of Nu(1)+Nu(2)+...+Nu(n), the bit streams of the first group for the first frequency domain can be referred to as frequency domain having Nu(1)+Nu(2)+... Nu(n)-size subcarriers.

Lastly, since the data symbols of the first group are allocated mutually exclusive frequency resources within the first frequency domain, similar to the OFDMA scheme, the data symbols of the first group can be allocated the frequency resources in the first frequency domain. To put differently, the frequency resources associated with the first frequency domain are allocated according to the conventional OFDMA scheme.

As discussed above, the plurality of bits streams is inputted for processing and another specified group of bit streams (hereafter, referred to as a second group) are mapped to the data symbols by the constellation mapping module. Here, at least one bit stream is mapped to one data symbol, and the bit streams of the second group are bit stream (N+1)-bits stream (N+n) of FIG. 5a. The mapped data symbols are then processed by the frequency domain spreading module. The frequency domain spreading module uses a code having a length of Na to spread the data symbols of the second group on the frequency resources (e.g., subcarriers) corresponding to the Na times the frequency domain.

The frequency domain spreading module can be explained by FIG. 2 but the structure or composition of the frequency domain spreading module is not limited to FIG. 2. For example, the frequency domain spreading module can include a code spreading unit for spreading the bit streams in terms of the length of Na and S/P converter for converting parallel data symbols per each Na. Referring to FIG. 2, the data symbols of the second group are copied for Na number of signals and each copied signal is multiplied by the length of the entire Na code (e.g., $[C_1, C_2, C_3 \ldots C_{na}]$. The frequency domain spreading can be achieved in terms of Na times by the frequency domain spreading module. The transmitting end can have at least one frequency domain spreading module having different codes so as to allow the receiving end to identify data symbols of different bit streams.

Preferably, since the output from each of the frequency domain spreading module is combined, the codes having the Na length are orthogonal to each other. Further, the codes maintaining orthogonality can be of various types such as Walsh code, Orthogonal Variable Spreading Factor (OVSF) code, and pseudo noise (PN) code. Although the data symbols of the second group can be identified by the codes having orthogonality, these data symbols are allocated the frequency resources according to the conventional MC-CDMA scheme.

As discussed, the data symbols of the first group outputted from the S/P converters are mapped to the first frequency domain by the symbol-to-subcarrier mapping module. Similarly, the data symbols of the second group outputted from the frequency domain spreading module are mapped to a specified frequency domain (hereafter, referred to as a second frequency domain—in which the subcarriers can be consecutive or distributed) by the symbol-to-subcarrier mapping module. The data symbols of the second group can be allocated the frequency resources according to the conventional MC-CDMA scheme.

The Nc-Point IFFT module multiplies the data symbols mapped by the symbol-to-subcarrier mapping module to the subcarriers. Furthermore, the cyclic prefix module attaches a cyclic prefix and is processed through the P/S converter.

Figure 5B:
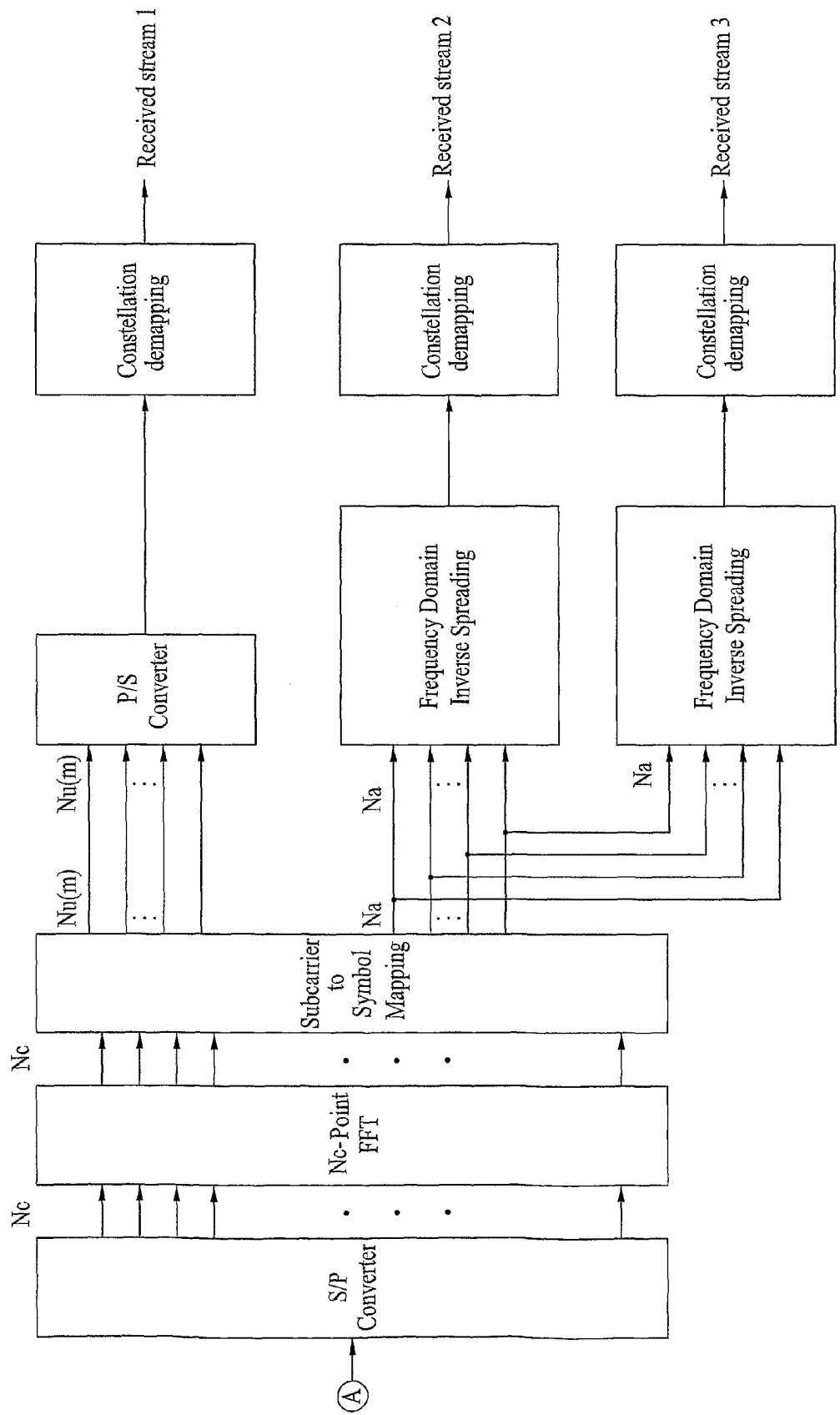
FIG. 5b is a block diagram of a receiving end of a communication system using combined OFDMA and MC-CDMA schemes according to an embodiment of the present invention.

FIG. 5b is a block diagram of a receiving end of a communication system using combined OFDMA and MC-CDMA schemes according to an embodiment of the present invention. The structures of the receiving end are reverse order to the structures of the transmitting end. Similarly, the operations of the receiving end are reverse to those of the transmitting end. More specifically, referring to FIG. 5b, the received signals from the transmitted end is converted to Nc number of parallel signals by the S/P converter and are then processed by the Nc-Point FFT module. Further, the output of the Nc-Point FFT module is then inputted into the subcarrier-to-symbol mapping module which maps the subcarriers to data symbols.

The subcarrier-to-symbol mapping module maps the subcarriers associated with the first group to data symbols. Here, the subcarriers are associated with the frequency resources allocated according to the OFDMA scheme. The data symbols outputted from the subcarrier-to-symbol mapping module are then inputted into the P/S converter and a constellation demapping module so that the data symbols can be decoded. That is, the bit streams (e.g., bit stream 1-bit stream N) are decoded and recovered by processing the data symbols through the P/S converter and the constellation demapping module.

In addition, the subcarrier-to-symbol mapping module maps the subcarriers associated with the second group to data symbols. Here, the subcarriers are associated with the frequency resources allocated according to the MC-CDMA scheme. The data symbols outputted from the subcarrier-to-symbol mapping module are then inputted into a frequency domain inverse spreading module. Since the transmitting end used a frequency domain having Na number of subcarriers as the second frequency domain, Na number of data symbols are inputted into the frequency domain inverse spreading module. Thereafter, the frequency domain inverse spreading module uses the orthogonal codes to decode and recover original data stream.

The first frequency domain and the second frequency domain, as discussed above, can have fixed or variable allocated frequency resources. A number of data symbols outputted from the S/P converter of the transmitting end is determined based on the number of subcarriers in the first frequency domain. Similarly, a number of data symbols outputted from the frequency domain spreading module is determined based on the number of subcarriers in the second frequency domain.

If each frequency domain is fixed, the symbol-to-subcarrier mapping module allocates the data symbols of the first frequency domain to predetermined subcarriers of the first frequency domain and the data symbols of the second frequency domain to predetermined subcarriers of the second frequency domain.

If the frequency domain is a variable frequency domain, symbol-to-subcarrier mapping information regarding the data symbols from the frequency domain spreading module being mapped to the subcarriers has to be provided to the receiving end. The mapping information can be transmitted to the receiving end via a data channel or a control channel. Alternatively, the mapping information can be included in one of the plurality of bit streams transmitted via a transmitter (not shown) to the receiving end.

The plurality of bit streams transmitted from the transmitting end can contain various types of data. Based on the type of data, the data can be transmitted to the receiving end after being processed by the frequency domain spreading module or without being processed by the frequency domain spreading module. For example, the control information is transmitted after being spread by the frequency domain spreading module while the payload containing the data is transmitted without being spread by the frequency domain spreading module.

Figure 6A:
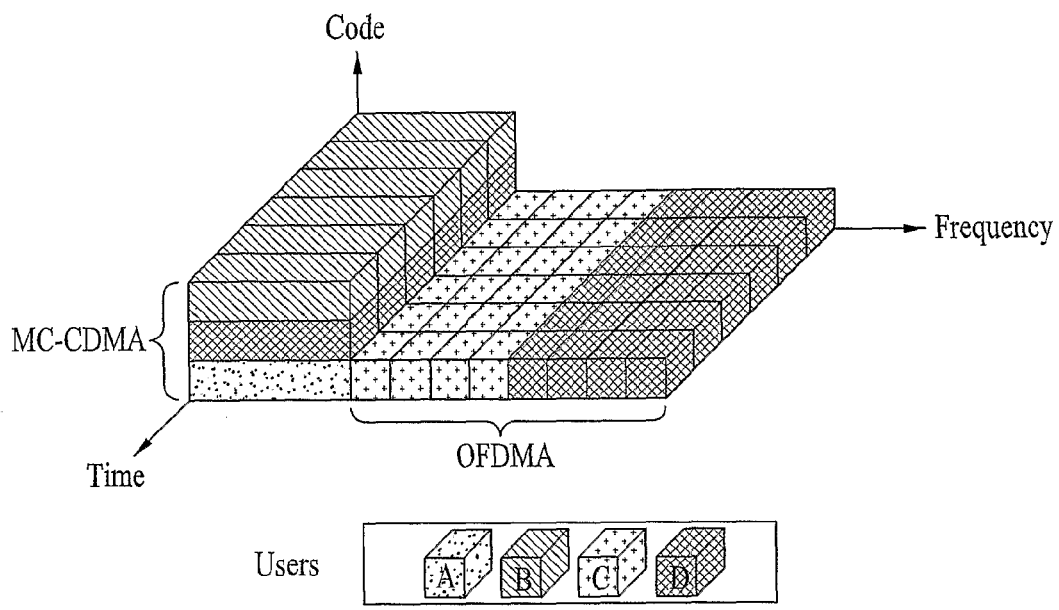
FIG. 6a is an exemplary diagram of allocated frequency resources according to an embodiment of the present invention.

FIG. 6a is an exemplary diagram of allocated frequency resources according to an embodiment of the present invention. Here, data symbols for multiple users are spread by different codes are allocated to subcarriers. Referring to FIG. 6a, the data symbols for users A, B, and D are spread by the frequency domain spreading module using different codes and as such, the data for users A, B, and D are allocated to subcarriers of the second frequency domain. Further, the data symbols for user C and user D are not spread by the frequency domain spreading module and allocated independently to the subcarriers. Here, the subcarriers belong to the first frequency domain. As for the data symbols for user D, they can be processed through the S/P converter and the frequency domain spreading module, as shown in FIG. 5a, and can be allocated to the subcarriers of the first frequency and the second frequency, respectively. As discussed above, the first frequency domain is associated with the OFDMA scheme, and the second frequency domain is associated with the MC-CDMA scheme. Here and other embodiments to follow, it is important to note that spreading of the data symbols is not limited to the frequency domain but can be spread in time domain as well.

Figure 6B:
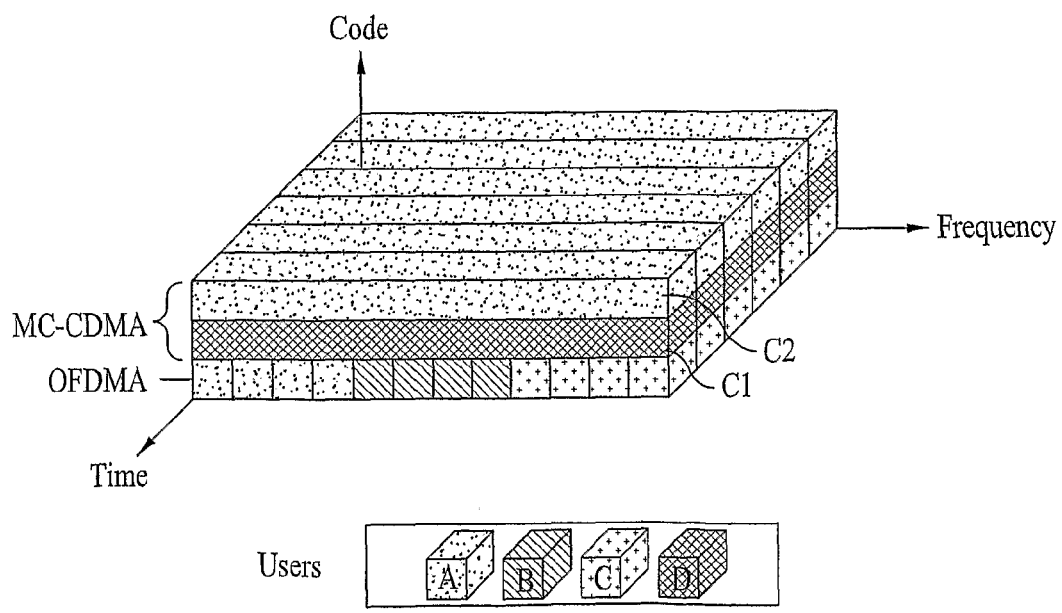
FIG. 6b is another exemplary diagram of allocated frequency resources according to an embodiment of the present invention.

FIG. 6b is another exemplary diagram of allocated frequency resources according to an embodiment of the present invention. In FIG. 6b, data symbols for users A, B, and C are allocated independently to the subcarriers of the first frequency domain. At the same time, the data symbols for user D are spread by the frequency domain spreading module and allocated to the subcarriers of the second frequency across the entire frequency domain. Furthermore, the data symbols for user A are spread by the frequency domain spreading module and allocated to the subcarriers of the second frequency across the entire frequency domain. As discussed above, the codes used to spread the data symbols are different so as to eliminate the ISI. The difference between from FIG. 6a is that the subcarriers are spread across the entire frequency domain whereas in FIG. 6a, the subcarriers are spread to a specific portion of the frequency domain.

Figure 6C:
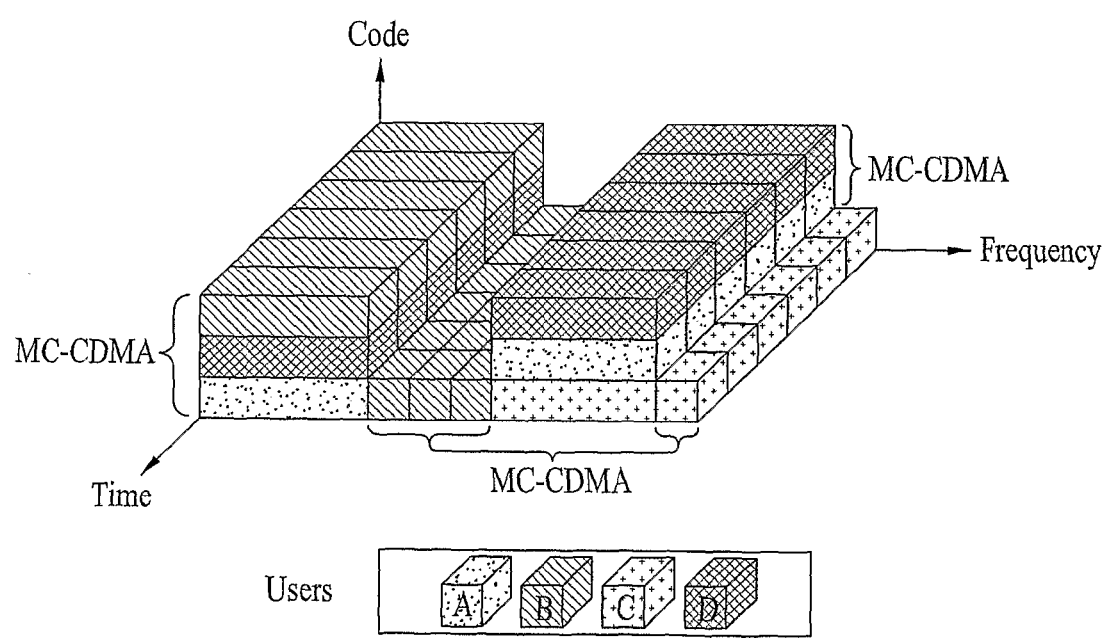
FIG. 6c is another exemplary diagram of allocated frequency resources according to an embodiment of the present invention.

FIG. 6c is another exemplary diagram of allocated frequency resources according to an embodiment of the present invention. According to FIG. 6c, data symbols for users A, C, and D are spread by the frequency domain spreading module using different codes and as such, the data for users A, B, and D are allocated to subcarriers of the second frequency domain. The data symbols for user C is not spread by the frequency domain spreading module and allocated independently to the subcarriers. Difference between this figure from FIG. 6a is that data symbols for users A, C, and D are spread and allocated to subcarriers of the second frequency. That is, the data symbols for all the users can be spread and allocated without limitations in any combination. For example, the data symbols for all the users can be spread by the frequency domain spreading module using different codes or the data symbols for certain users can be spread.

Figure 7A:
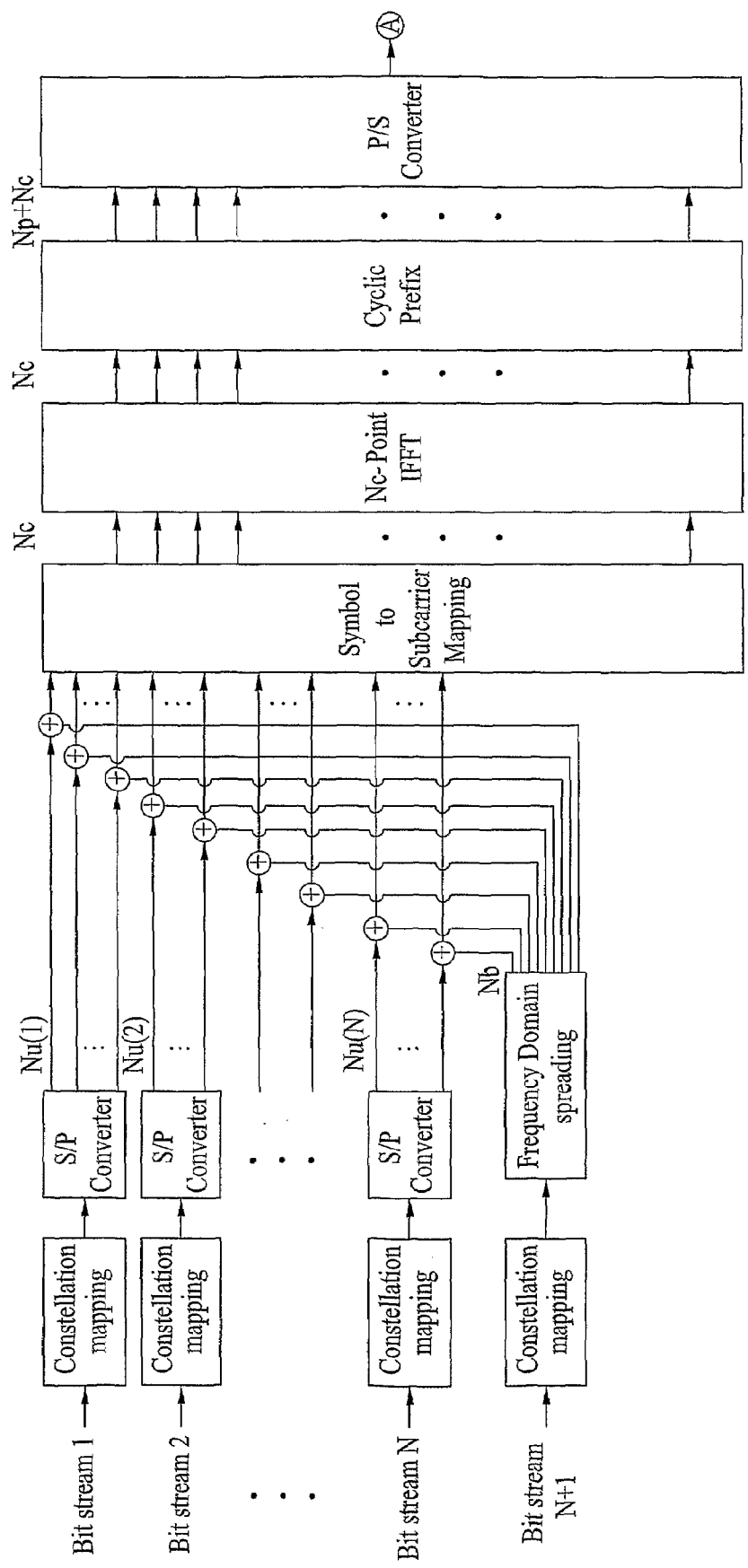
FIG. 7a is a block diagram of a transmitting end of a communication system using combined OFDMA and MC-CDMA schemes according to another embodiment of the present invention.

FIG. 7a is a block diagram of a transmitting end of a communication system using combined OFDMA and MC-CDMA schemes according to another embodiment of the present invention. In this embodiment, data symbols associated with a particular group (hereafter, referred to as a third group) are allocated to mutually exclusive wireless resources across the entire frequency domain. After a specified data symbols of another group (hereafter, referred to as a fourth group) are spread using different codes, the specified data symbols of the fourth group share a part of or all of the frequency resources allocated to the data symbols of the fourth group.

A structure of the transmitting end of the communication system according to this embodiment is similar to the structure introduced in FIG. 5a. That is, the structure of the transmitting end of the communication system includes at least one constellation mapping module, at least one S/P converter corresponding to the constellation mapping module, a frequency domain spreading module corresponding to the constellation mapping module, a symbol-to-subcarrier module, a Nc-Point IFFT module, a cyclic prefix module, and a P/S converter.

The operations of the transmitting end with respect to data of the third group, referring to bit stream 1-bit stream N, are same as discussed in FIG. 5a.

The operations of the transmitting end with respect to data of the fourth group, referring to bit stream N+1, are same until the data symbols are spread by the frequency domain spreading module. Thereafter, the spread data symbols outputted from the frequency domain spreading module are combined with the parallel data symbols of the third group outputted from the S/P converters. The combined data symbols are then inputted into the symbol-to-subcarrier mapping module.

As discussed above, the data symbols of the third group are allocated the subcarriers that are mutually exclusive while the data symbols of the fourth group are allocated to subcarriers after being spread. Here, the data symbols of the fourth group, which have been spread, can be combined with the data symbols of the third group and then allocate to subcarriers. If all of the data symbols of the fourth group are combined with the data symbols of the third group, then the data symbols of the third and the fourth group can share the entire frequency domain. If, however, less-than-all of the data symbols of the fourth group are combined with the data symbols of the third group, then a specified portion of the frequency domain can be shared by the data symbols of the third and the fourth group. More detailed discussions of the combined data symbols are provided with respect to FIGS. 7a -7c.

As discussed, the data symbols of the fourth group are allocated to subcarriers after being spread by the frequency domain spreading module. Here, the power per subcarrier of the data symbols of the fourth group outputted from the frequency domain spreading module is smaller than the power per subcarrier of the data symbols of the third group outputted from the S/P converter. Further, as the data symbols of the fourth group is spread across even a larger frequency domain, the power per subcarrier of the data symbols outputted from the frequency domain spreading module becomes smaller.

According to FIG. 7a, the data symbols of the fourth group outputted from the frequency domain spreading module are combined with the data symbols of the third group outputted from the S/P converter so that the conventional MC-CDMA and OFDMA schemes can be used in combination and the limited frequency resources can be efficiently used.

After the combined data symbols of the third and fourth groups are mapped to subcarriers by the symbol-to-subcarrier mapping module, these combined symbols are mapped to subcarriers by the Nc-Point IFFT module. Thereafter, the output of the Nc-Point IFFT module is processed by the P/S converter and transmitted to the receiving end.

Similarly to the discussion of FIG. 5a, bit stream 1-bit stream N are converter into Nu(n) number of data symbols by the constellation mapping module. The bit stream N+1 is processed by the frequency domain spreading module, and the power per subcarrier of spread data is Nb times the original power. Since bit stream N+1 is spread Nb times the original power, even if the power per subcarrier of the signal is relatively small, the receiving end does not have much problem decoding the signal. The output of the frequency domain spreading module whose signal power per subcarrier is relatively smaller than the output of the S/P converter is combined with the output of the S/P converter and then processed by the symbol-to-subcarrier mapping module. Thereafter, the processed data is mapped to subcarriers by the Nc-Point IFFT module whose output is then converted by the P/S converted, before being transmitted to the receiving end.

As discussed, the data symbols associated with bit stream 1-bit stream N are allocated mutually exclusive frequency resources (e.g., subcarriers). However, since the data symbols associated with bit stream N+1 are spread Nb times the original power by the frequency domain spreading module. As such, Nb out of Nc number of subcarriers are allocated for the data symbols. Here, even though a single subcarrier can carry data symbols for different bit streams (e.g., bit stream 1 and bit stream N+1), since the signal for bit stream N+1 is relatively small, the receiving end faces minor, if any, problems decoding the received signal. Having said that, there is no limit to the number of bit streams included in the data symbols for the fourth group. However, if there are too many bit streams represented by the data symbols of the fourth group, interference with the data symbols of the third group can increase. In consideration of interference with the data symbols of the third group, it is preferable to limit the number of bit streams represented by the data symbols of the fourth group.

Figure 7B:
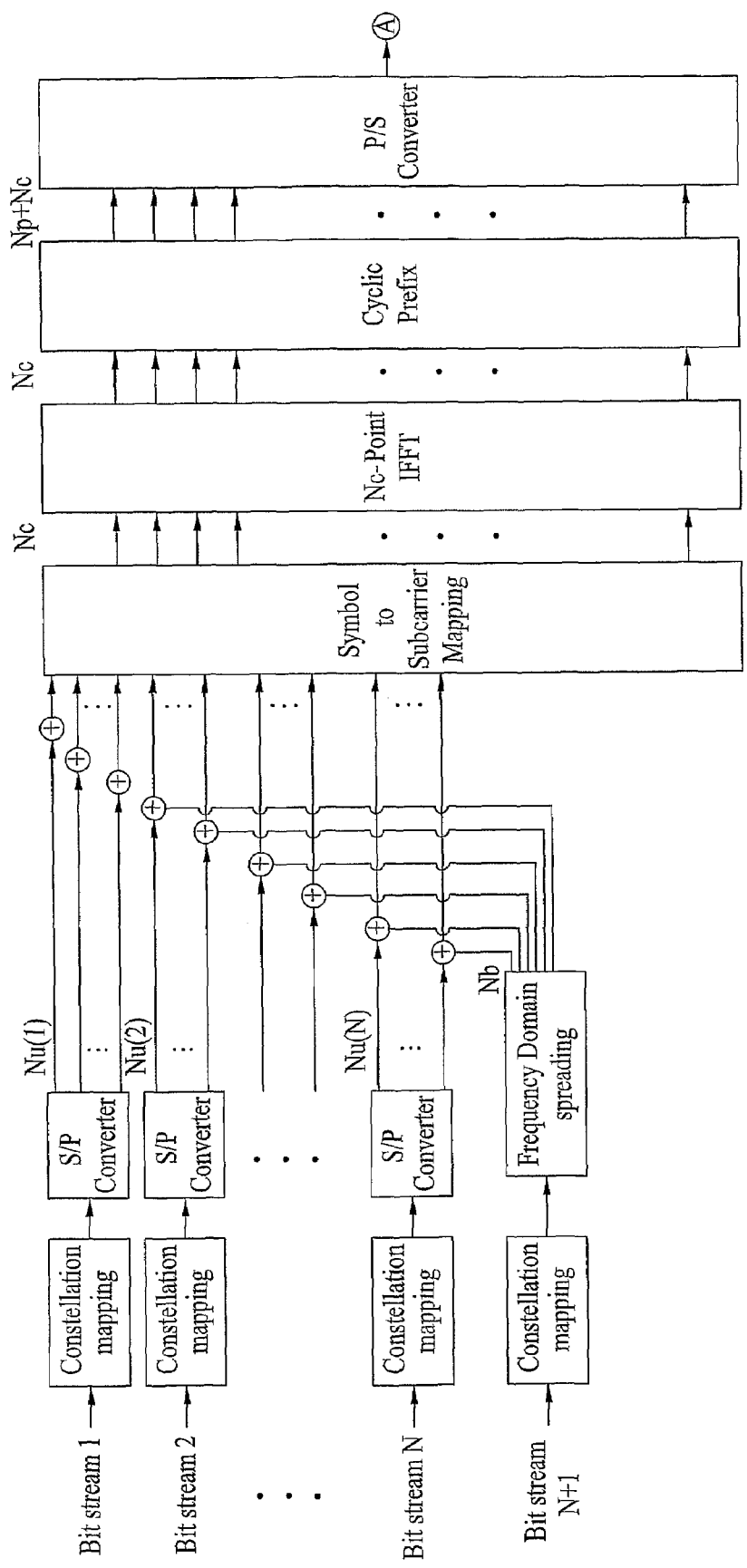
FIG. 7b is a block diagram of a transmitting end of a communication system using combined OFDMA and MC-CDMA schemes according to another embodiment of the present invention.

FIG. 7b is a block diagram of a transmitting end of a communication system using combined OFDMA and MC-CDMA schemes according to another embodiment of the present invention. The structure illustrated in FIG. 7b is similar to the structure of FIG. 7a with a slight difference. In FIG. 7a, all of the data symbols of the fourth group are combined with the data symbols of the third group. However, in FIG. 7b, a specific number of data symbols outputted from the frequency domain spreading module are combined with the data symbols of the third group. Here, the specified number can range from at least one to all. Even though not all the data symbols are combined, non-combined data symbols are allocated to subcarriers in a same manner as explained with respect to FIG. 5a.

In detail, the non-combined data symbols are allocated to subcarriers according to respective OFDMA scheme and the MC-CDMA scheme. That is, the non-combined data symbols of the third group are allocated mutually exclusive subcarriers while the data symbols of the fourth group are allocated the subcarriers after being spread by different codes so as to minimize interference.

For example, since the data symbols of the third group associated with bit stream 1 are not combined with the data symbols of the fourth group associated with bit stream N+1, they are mapped to the mutually exclusive subcarriers of the first frequency domain. Moreover, since the data symbols of the fourth group associated with bit stream N+1 are not combined with the data symbols of the fourth group associated with bit stream 1, they are mapped to the subcarriers after being spread by different codes by the symbol-to-subcarrier mapping module.

Figure 7C:
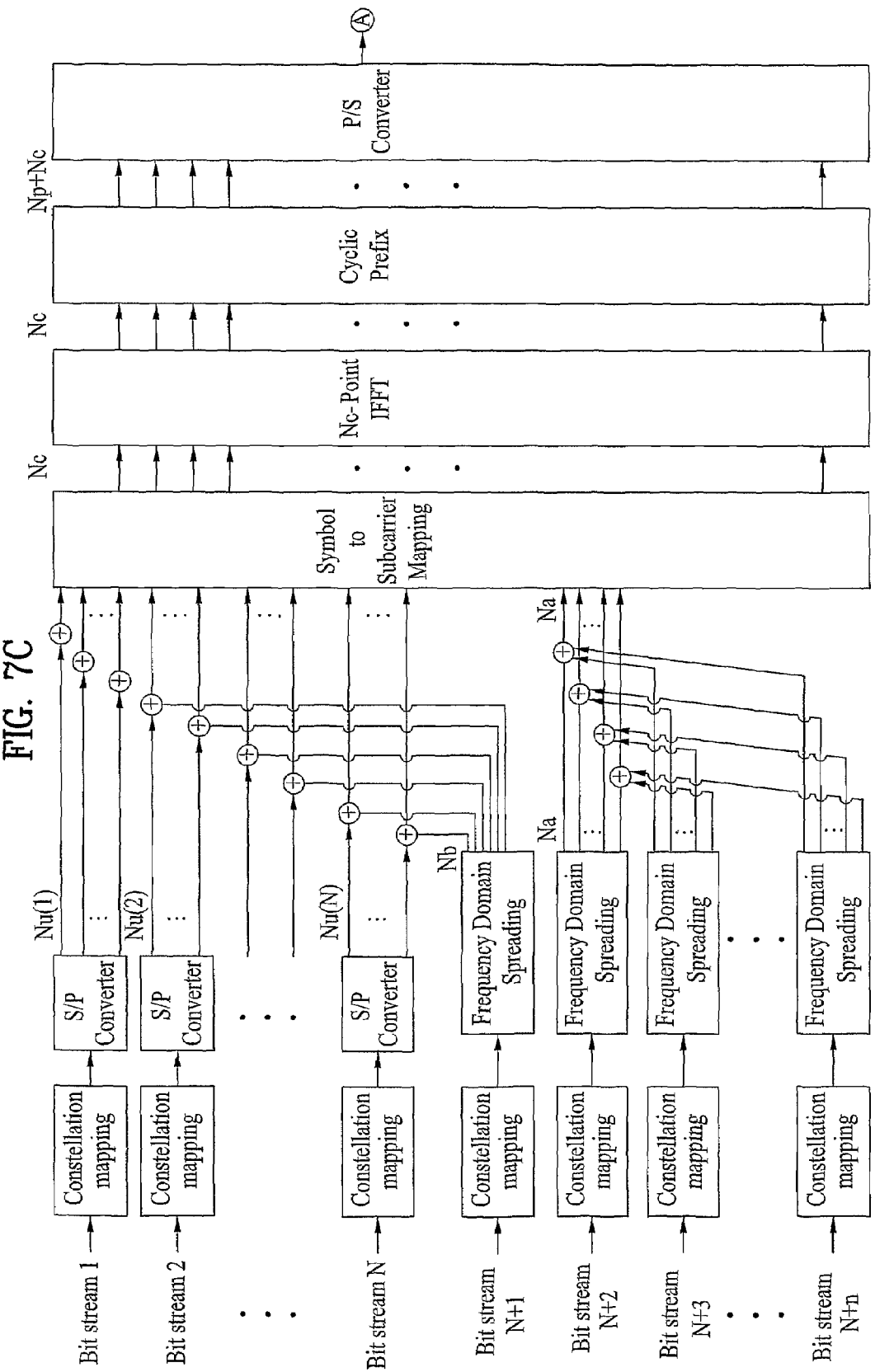
FIG. 7c is a block diagram of a transmitting end of a communication system using combined OFDMA and MC-CDMA schemes according to another embodiment of the present invention.

FIG. 7c is a block diagram of a transmitting end of a communication system using combined OFDMA and MC-CDMA schemes according to another embodiment of the present invention. More specifically, FIG. 7c represents a combined structure of FIGS. 7a and 7b and the structure for spreading the data symbols of the second group of FIG. 5a.

The discussions with respect to FIGS. 7a and 7b, and the discussion with respect to allocating the data symbols of the second group associated with bit stream (N+2)-bit stream (N+n) are provided above, the same discussion can be applied for FIG. 7c. It is important to note that additional combinations of the structures and corresponding operations can be applied and are not limited to the discussion of FIG. 7a - 7c.

FIG. 7d is a block diagram of a receiving end of a communication system using combined OFDMA and MC-CDMA schemes according to another embodiment of the present invention. Since the processes of the receiving end are opposite to those of the transmitting end, the operations of the modules are carried in reverse order. For example, prior to the transmission from the transmitting end, the data symbols mapped to the subcarriers were processed through the P/S converter. Upon receipt of the transmitted data symbols, the receiving end processes the data symbols through the S/P converter which performs the opposite operation to that of the P/S converter.

In FIG. 7d, after the data symbols are processed through the subcarrier-to-symbol mapping module, the data symbols are inputted to respective modules. That is, the data symbols of the third group are inputted into at least one P/S converter corresponding to the number of data symbols defined at the transmitting end, and the data symbols of the fourth group are inputted into the frequency domain inverse spreading module before being demapped by the constellation demapping module. Here, the data symbols of the third group and the fourth groups were combined before they were mapped to the subcarriers. Therefore, after they are identified as to which group they belong, these data symbols are processed accordingly. As discussed, the data symbols of the third group are processed by the OFDMA scheme, and the data symbols of the fourth group are processed by the MC-CDMA scheme. Lastly, through the demapping procedure, the original bit streams can be acquired. The procedures in FIG. 7d are similar to those of FIG. 5b.

Figure 8:
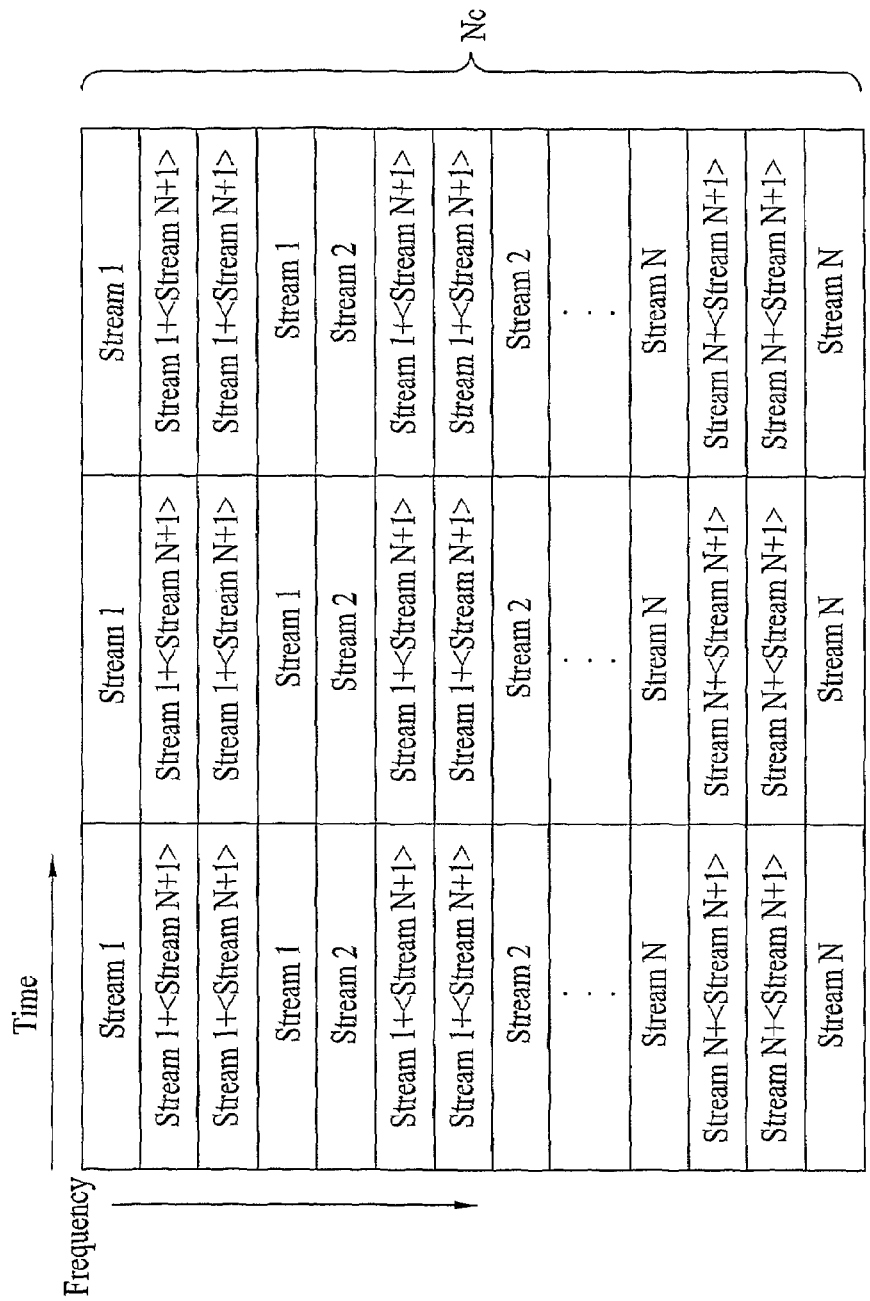
FIG. 8 is an exemplary diagram of frequency resource allocation.

FIG. 8 is an exemplary diagram of frequency resource allocation. As discussed, stream 1-stream N are represented by data symbols mutually exclusively allocated to Nc number of subcarriers according to the conventional OFDMA scheme. That is, stream 1-stream N represent data symbols of the third group. Conversely, stream N+1 is represent by data symbols spread across Nb number of subcarriers according to the conventional MC-CDMA scheme. That is, stream N+1 represent data symbols of the fourth group. In FIG. 8, stream N+1 are spread on half of the entire Nc number of subcarriers where Nb represents half of Nc. Here, Nb can be fixed or varied. Further, a part of the entire frequency domain can be used as a protective domain and only a specific domain can be used as active frequency domain.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of transmitting data in a multi-carrier communication system, the method comprising:
   converting serial data symbols of a first group to parallel data symbols;
   spreading one or more data symbols of a second group using different codes;
   combining the spread one or more data symbols of the second group with the parallel data symbols of the first group, wherein fewer than all of the one or more spread data symbols of the second group are combined with the parallel data symbols of the first group;
   mapping at least one of the combined data symbols to at least one subcarrier, wherein each of the at least one subcarrier carrying the at least one of the combined data symbols is mutually exclusive;
   mapping at least one data symbol of a third group to at least one subcarrier, wherein each of the at least one subcarrier carrying the parallel data symbols of the first group and the at least one data symbol of the third group is mutually exclusive;
   transforming the at least one of the combined data symbols mapped to the at least one subcarrier by an inverse discrete Fourier transform (IDFT) module; and
   transmitting the at least one transformed combined data symbols to a receiving end.

2. The method of claim 1, wherein the different codes maintain orthogonality from each other.

3. The method of claim 1, further comprising mapping each bit stream associated with the first group and the second group to at least one data symbol using a modulation scheme.

4. The method of claim 3, wherein the modulation scheme is Quadrature Phase Shift Keying (QPSK) or 16 Quadrature Amplitude Modulation (QAM).

5. The method of claim 1, wherein a number of data symbols of the first group associated with a first bit stream is different from a number of data symbols of the first group associated with a second bit stream.

6. The method of claim 1, wherein each of the at least one data symbol of the third group is spread by at least one code which is orthogonal to other codes.

7. The method of claim 1, wherein a cyclic prefix is added to each of the transformed data symbols.

8. An apparatus for transmitting data in a multi-carrier communication system, the apparatus comprising:
   a Serial to Parallel (S/P) Converter for converting serial data symbols of a first group to parallel data symbols;
   a Frequency Domain Spreading Module for spreading one or more data symbols of a second group using different codes;
   a Combine Module for combining the spread one or more data symbols of the second group with the parallel data symbols of the first group, wherein fewer than all of the one or more spread data symbols of the second group are combined with the parallel data symbols of the first group;
   a Symbol to Subcarrier Mapping module for:
      mapping at least one of the combined data symbols to at least one subcarrier, wherein each of the at least one subcarrier carrying the at least one of the combined data symbols is mutually exclusive; and
      mapping at least one data symbol of a third group to at least one subcarrier, wherein each of the at least one subcarrier carrying the parallel data symbols of the first group and the at least one data symbol of the third group is mutually exclusive;
   a transformer for transforming the at least one of the combined data symbols mapped to the at least one subcarrier by an inverse discrete Fourier transform (IDFT) module; and
   a transmitter for transmitting the at least one transformed combined data symbols to a receiving end.

* * * * *